Feb. 21, 1956 G. L. OMON ET AL 2,735,696
COUPLING
Filed Oct. 3, 1951 2 Sheets-Sheet 1
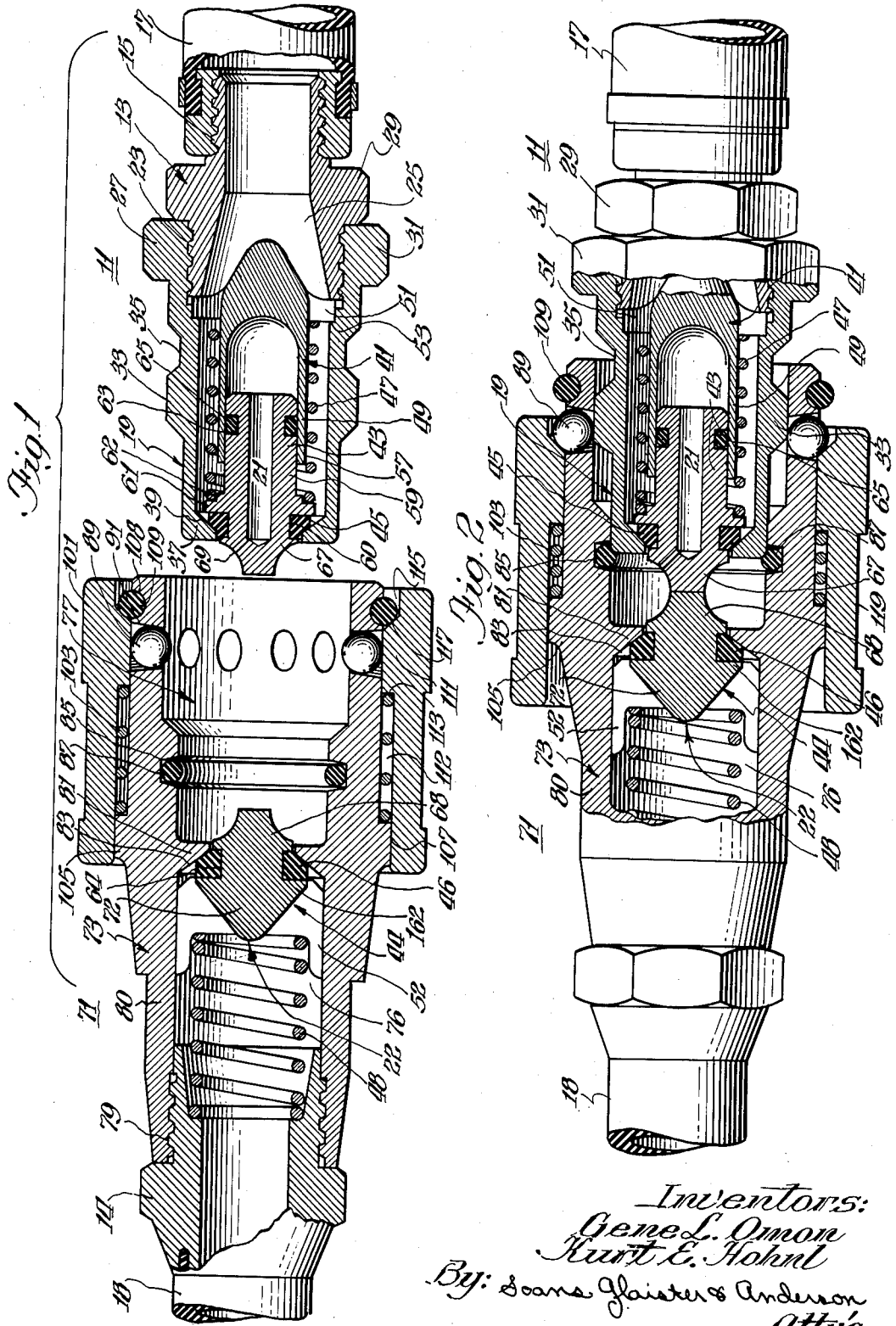
Inventors:
Gene L. Omon
Kurt E. Hohnl
By: Soans, Glaister & Anderson
Atty's.

Feb. 21, 1956  G. L. OMON ET AL  2,735,696
COUPLING
Filed Oct. 3, 1951  2 Sheets-Sheet 2
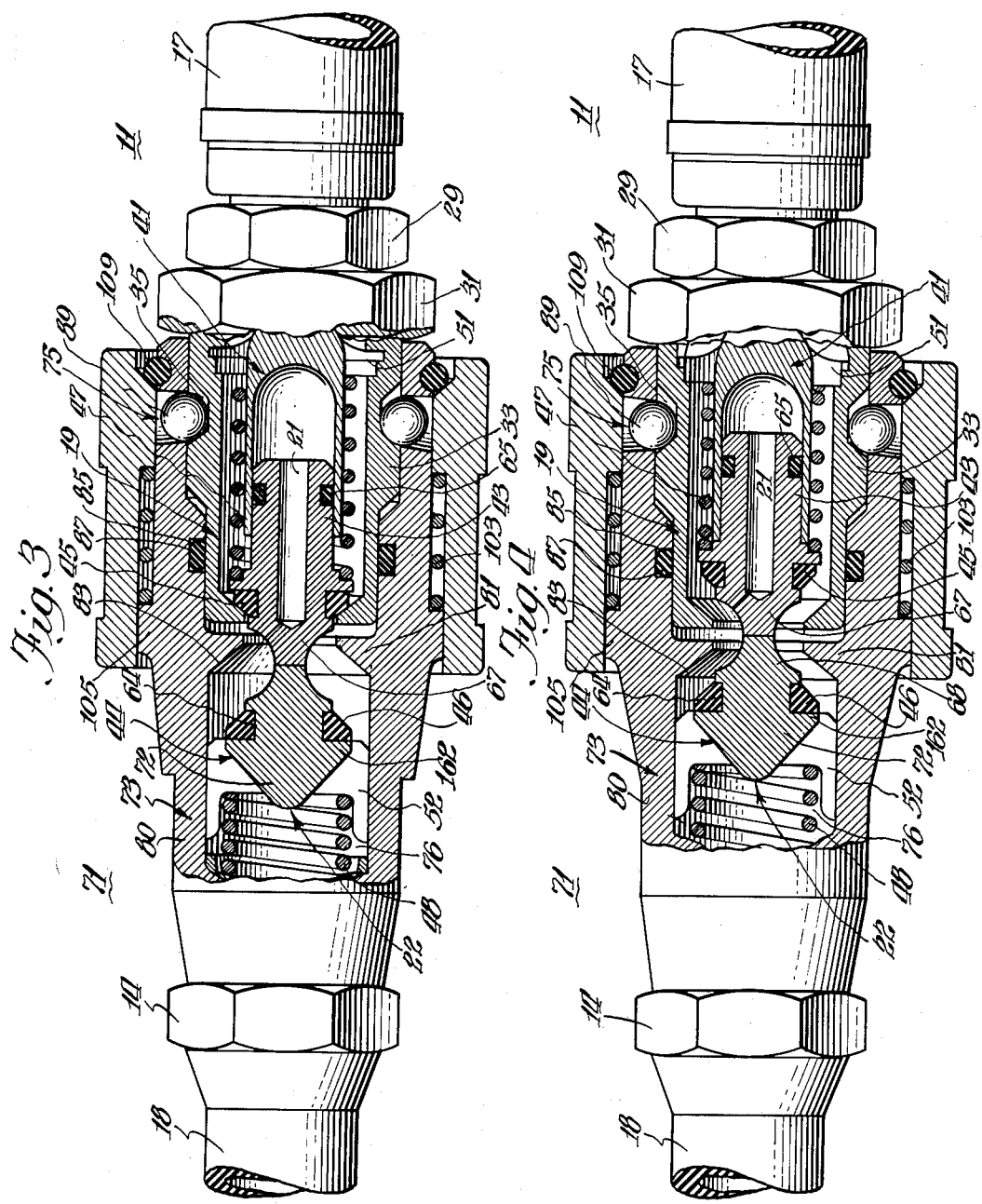
Inventors:
Gene L. Omon
Kurt E. Hohnl
By: Soans Glaister & Anderson
Attys.

United States Patent Office 2,735,696
Patented Feb. 21, 1956

2,735,696

COUPLING

Gene L. Omon and Kurt E. Hohnl, Milwaukee, Wis., assignors to J. I. Case Company, Racine, Wis., a corporation of Wisconsin Application October 3, 1951, Serial No. 249,552

1 Claim. (Cl. 284—19)

The present invention relates to couplings for fluid systems, and in particular to, readily separable and readily connectable, valved couplings for interconnecting fluid conduits.

Valved couplings for fluid systems usually include a male connecting member and a female connecting member which are adapted to be inter-engaged with one another, each of the members being adapted to be attached to a separate fluid conduit. Each connecting member is provided with a valve mechanism which automatically closes the conduit associated with that member when the members are disconnected and which automatically opens the associated conduit when the members are inter-engaged or interconnected. Thus, when the two members are interconnected and when the fluid pump is operated, hydraulic fluid can flow freely between the conduits, and when the two members are disconnected, the ends of the conduits are automatically sealed to prevent the loss of hydraulic fluid. Valved couplings of the class described are particularly useful in hydraulic systems which must be frequently connected and disconnected, as for example, in the hydraulic systems which extend between coupled vehicles wherein the hydraulic pressure unit on one vehicle is adapted to operate a hydraulically-actuated device on another vehicle.

Often, when the hydraulically-actuated device is disconnected from its source of pressure fluid, the pressure in the portion of the system containing that device remains at high pressure. However, in most instances the portion of the system which contains the hydraulic pressure unit drops to atmospheric pressure as soon as the pump is shut down. The present valved coupling is particularly useful in hydraulic systems of this type wherein a hydraulically-actuated device which is at a high pressure is connected to a hydraulic pressure unit which is at a low pressure.

The principal object of the present invention is the provision of an improved, valved coupling of the class described which will overcome the deficiencies of the prior art devices, which will be relatively inexpensive to manufacture, and which will be operable to connect two fluid systems with a minimum effort by the operator. A further object of the invention is the provision of an improved, valved coupling which is particularly operable to connect a hydraulic system which is at a high pressure with a hydraulic system which is at a much lower pressure. Further objects and advantages of the invention will become apparent by referring to the accompanying drawings and the following description of one embodiment thereof.

In the drawings:

Fig. 1 is a sectional, elevational view of a two-member valved coupling embodying various features of the invention, the connecting members being separated;

Fig. 2 is an elevational view, partly in section, of the valved coupling of Fig. 1 showing the connecting members as they appear at the beginning of their movement towards their inter-engaging position;

Fig. 3 is a view similar to Fig. 2 showing the connecting members in their inter-engaging position when the fluid pressure in the conduit leading to the male connecting member is greater than the fluid pressure in the conduit leading to the female connecting member; and Fig. 4 is a view similar to Figs. 2 and 3 showing the connecting members in their inter-engaging position when the fluid pressures in the conduits leading to the two connecting members are approximately equal.

The valved or self-sealing breakaway coupling illustrated in the drawings and which is particularly adapted for connecting a hydraulically-actuated device which is maintained at a high fluid pressure with a hydraulic pressure unit which is at a much lower fluid pressure includes a male and a female connecting member which are adapted to be inter-engaged and releasably locked together. Each of the connecting members includes a housing which contains a valve which is biased against a suitable valve seat for sealing the end of its associated conduit when the male and female connecting members are disengaged from each other. The relative forces exerted by the biasing means within the housings on their associated valves being of such strengths that when the connecting members are inter-engaged or interconnected, but before pressure is applied by the hydraulic pressure unit, they allow the valve on the side of the hydraulic pressure unit to open fully while the valve on the side of the hydraulically-actuated device remains closed, and after pressure is applied by the hydraulic pressure unit, they cause the valve on the side of the hydraulically-actuated device to open. In addition, a stop is provided within the housing on the side of the hydraulically-actuated device which prevents the valve on that side from opening beyond a predetermined point.

The housings for the male connecting member and the female connecting member are proportioned so that they may be slidably engaged with one another, and suitable packing rings are provided to effect a fluid-tight seal between these elements. The housing for the female connecting member is provided with a locking means which is adapted to releasably engage a portion of the male member of the coupling to releasably lock the two members together.

In the illustrated embodiment of the coupling, the male connecting member indicated at 11 in Fig. 1 is adapted to be connected to the high pressure system, i. e. to the portion of the overall system which may be maintained at high pressure when the coupling members are disconnected. The member 11 includes an adapter 13 which is provided with a threaded portion 15 at one end to facilitate attachment of the male connecting member 11 to a fluid conduit 17, a generally tubular housing 19 which is adapted to be attached at the other end of the adapter 13, and a spring-pressed valve mechanism 21 which is disposed within and which is coaxial with the housing 19. The adapter 13 is a hollow-fitting fabricated from metal, or the like, which is provided at its rearward end with the threaded portion 15 for attachment to the associated conduit 17 and at its forward end with a second threaded portion 23 which is adapted to engage the housing 19. The hollowed-out portion of the fitting is of generally frusto-conical shape, as illustrated at 25 in Fig. 1, the hollowed portion 25 enlarging from a point adjacent the conduit 17 to a point adjacent the housing 19. The frusto-conical shape of the hollowed-out portion of the adapter 13 aids in causing the liquid flowing through the fitting to assume streamline characteristics.

The housing 19 which forms part of the male connecting member 11 is generally tubular in form and is provided with a threaded portion 27 on the inner surface of one end for attachment to the threaded portion 23 on the adapter 13. The adapter 13 and the housing 19 are provided with multi-sided collars, 29 and 31, respectively, whereby the two elements may be gripped with wrenches to facilitate the assembly and disassembly of the male connecting member. The outer surface of the housing 19 is provided with a raised camming portion 33 and a circumferential groove 35, this groove 35 providing means for locking the male connecting member 11 of the coupling into the female connecting member, as will appear more clearly hereinafter. The forward end of the tubular-shaped housing 19 is flanged inwardly to form a shoulder 37 which is beveled to provide a seat 39 for the valve mechanism 21.

When the male connecting member is to be connected in the conduit leading to the hydraulically-actuated device, the valve mechanism may be constructed in the manner shown in the drawings. As has been pointed out, the comparative value of the force exerted by the biasing means on the valve and the provision of a stop which prevents the valve from opening beyond a predetermined point are important features which are incorporated into the valve mechanism within the connecting member which is connected in the conduit leading to the hydraulically-actuated device. As will be seen from the subsequent description, the force exerted by the biasing means on the valve within the connecting member located on the side of the hydraulically-actuated device should be less than the force exerted by the biasing means on the valve within the connecting member located on the side of the hydraulic pressure unit.

The valve mechanism 21 which is disposed within the housing 19 of the male connecting member 11 includes a valve guide, or cylinder, 41, a valve piston 43 which is adapted to support a ring of packing material 45 for sealing the forward end of the housing 19, and a valve spring 47 which is adapted to act between the valve guide 41 and the valve piston 43 to bias the sealing ring 45 against the beveled seat 39 provided at the forward end of the housing 19. The valve guide 41 comprises a hollow, cylindrical member 49 which is closed at one end and which has three spider-like supports 51 extending transversely from the closed end. The supports 51 are adapted to be clamped between the threaded forward portion 43 of the adapter 13 and a shoulder 53 on the inner surface of the housing 19. The cylindrical portion 49 extends longitudinally of the housing and is disposed with its longitudinal axis coinciding with the longitudinal axis of the housing 19. The external surface of the valve guide 41 provides a bearing surface 57 for the spring 47.

The valve piston 43 also includes a hollow, cylindrical section 59 which is adapted to fit within the cylindrical portion 49 of the valve guide 41 and which has a diameter slightly less than the internal diameter of the inwardly-flanged shoulder 37 of the housing 19. A circumferentially extending bearing ridge 61 and a recess 60 are located on the outer surface of the piston 43 inwardly of the flanged forward end of the housing 19 and provide a permanent seat for the sealing ring 45. The bearing ridge 61 also provides a bearing surface for the forward end of the spring 47. The inner end of the ridge 61 includes a shoulder 62 which is adapted to engage the forward end of the valve guide 41, thereby preventing the valve mechanism from opening beyond a predetermined point.

A groove 63 is provided on the surface of the valve piston 43 which is disposed within the valve guide 41, and a ring of resilient sealing material 65 is disposed within the groove 63 to provide a fluid-tight seal between the inner surface of the valve guide 41 and the outer surface of the valve piston 43. The ring of resilient sealing material 65 is preferably of the O-ring type. An O-ring seal is a washer-like element which is usually fabricated from synthetic rubber. The O-ring rubber, as its name implies, is circular in form and is circular in cross-section. The ring is fabricated in such a manner that the surface of the ring presents a smooth, unbroken surface of a tore. The O-ring seal depends upon the toroidal shape of the sealing element and upon the pressure of the hydraulic fluid instead of upon a pressure joint, as in the case of the ordinary type packing. Accordingly, the groove for receiving an O-ring is proportioned with its depth slightly shallower than the cross-section of the O-ring to permit contact between the O-ring and the other element.

The forward end of the valve piston 43 extends beyond the shoulder 37 at the forward end of the housing 19 to provide an engaging stub 67, as illustrated in the drawings. The engaging stub 67 is adapted to bear against the valve mechanism of the female connecting member, as will be hereinafter described. A passageway 69 is provided through the engaging stub to permit air and hydraulic fluid to enter and to escape from the space between the valve guide 41 and the valve piston 43 when the valve mechanism 21 is moving from the open to the closed position.

When the couplings are united, hydraulic fluid surrounds the exterior of the piston 43 and the fluid, which is at relatively high pressure, may seep into the interior of the valve piston through the passageway 69 where the air pressure is initially at atmospheric pressure. As a consequence, when the couplings are united the interior of the chamber will become filled with hydraulic fluid, and when the couplings are disengaged, the hydraulic fluid in the interior of the valve chamber will drain out through the passageway 69. In addition, the passageway 69 permits the couplings to be operated when the O-ring 65 does not provide a completely tight fluid seal as the passageway 69 allows any fluid seeping through the O-ring 65 to escape from the interior of the piston 43 when the couplings are disengaged.

The forward end of the housing 19 is maintained closed at all times when the male and female connecting members are disengaged. The forces maintaining the valve mechanism closed are the sum of the forces exerted by the spring 47 between the valve piston 43 and the valve guide 41 and the forces exerted by the hydraulic fluid in the conduit 17 against the exposed area of the piston 43, i. e. against the inner end of the bearing ridge 61. Thus it will be seen that the illustrated construction reduces the initial pressure required to open the valve mechanism 21 as compared to the pressure which would be required if the entire cross-sectional area of the valve piston 43 were exposed to hydraulic fluid.

The male member inter-engages with a female connecting member which is shown at 71 in Fig. 1. The female member 71 includes an adapter 14, a housing 73, a valve mechanism generally designated at 22, and means for releasably engaging the female member 71 with the male member 11. As illustrated in the drawings, the adapter 14 on the female connecting member 71 is provided with a semi-permanent connection to its associated conduit 18.

The housing 73 of the female connecting member 71 is an elongated, hollow member of circular cross-section which includes a valve chamber 76 at its rearward end and an enlarged portion at its forward end which provides a receptacle, or socket, 77, for receiving the male connecting member. The enlarged socket portion 77 is also adapted to support the means for interlocking the male and female connecting members, 11 and 71, respectively. The rearward end of the housing 73 is provided with a threaded section 79 which is adapted to be attached to the adapter 14. Forwardly of the threaded section 79 the housing 73 includes a section 80 having a uniform circular bore therein which is adapted to slidably contain a valve piston 44.

When the female connecting member of the valved coupling is to be connected in the conduit leading to the hydraulic pressure unit, it may be constructed in the manner shown in the drawings. Preferably, as has been pointed out, the connecting member which is located in the portion of the over-all system which is at a lower pressure when the coupling is disconnected, e. g. on the side of the hydraulic pressure unit, includes a means biasing a valve towards its closed position which exerts a greater force than the biasing means within the connecting member on the side of the hydraulically-actuated device. In addition, the valve within the connecting member on the low-pressure side should not be stopped from moving towards its open position when the connecting members are inter-engaged.

As illustrated, the valve chamber 76 of the female connecting member 71 is cylindrical in shape, and its forward end is provided with an inwardly extending, annular flange 81 which includes a beveled seat 83. A valve piston 44 which is adapted to support a ring of packing material 46 for sealing the forward end of the valve chamber 76 is slidably contained within the housing 73. The valve piston 44 includes a forwardly extending, engaging stub 68, a cone-shaped rearward portion 72, and three transversely extending, spider-like supports 52. The spider-like supports 52 have arcuate-shaped, peripheral surfaces which are proportioned so as to slidably engage the inner surface of the housing section 80. A spring 48 which is substantially stronger than the spring 47 associated with the male connecting member is disposed between the adapter 14 and the valve piston 44 to bias the packing ring 46 against the valve seat 83. The valve piston 44 includes a circumferentially extending bearing ridge 162 and a recess 64 which provide a permanent seat for the sealing ring 46.

An annular groove 85 is provided in the inner surface of the receptacle or socket portion 77 of the housing forwardly of the flanged seat 83, and an O-ring 87 is fitted therein to provide a seal between the inner surface of the socket 77 and the outer surface of the housing 19 of the male connecting member 11 when the two members are locked together.

The locking means 75 for inter-engaging the male and female connecting members includes a plurality of circumferentially-disposed, spaced-apart balls 89 which are supported at the forward end of the socket-like portions 77 of the housing 73 and which are adapted to be moved into and out of engagement with a peripheral groove 35 provided on the external surface of the housing 19 for the male connecting member 11. The locking balls 89 may be ball bearings, or the like, and in order to maintain each of the balls in a predetermined radial position, a plurality of frustro-conical-shaped, spaced-apart, ball-positioning apertures 91 are provided around the periphery of the socket 77. The diameter of the apertures 91 at the outer periphery of the socket 77 is greater than the diameter of the balls 89, and the diameter of the apertures positioned at the inner periphery of the socket 77 is slightly smaller than the diameter of the balls 89. This permits radial movement of the balls 89 relative to the housing 73 and limits the inner movement of the balls to prevent them from falling into the housing.

The locking balls 89 are maintained in the innermost, or locking position, by a sleeve 101 which is biased by a spring 103 and which is slidably supported for longitudinal movement on the forward end of the housing 73. In order to provide a rearward bearing surface for the sleeve 101 and to provide a guide for the spring 103 which biases the sleeve 101, the external surface of the housing 73 rearwardly of the ball-positioning apertures 91 is provided with an annular rib 105 which includes a bearing surface 107 for the sliding sleeve 101. The surface of the housing 73 forwardly of the ball-positioning apertures 91 is provided with an annular groove 108 having a generally semi-circular cross-section. The groove 108 is adapted to receive a resilient O-ring 109 which serves as a dust seal and as a retainer for the sleeve 101.

The sliding sleeve 101, as illustrated, is generally tubular in shape and includes a section in its rearward end which has an internal diameter substantially equal to the annular rib 105 on the housing 73 and a section which has a reduced diameter at its forward end substantially equal to the forward end of the housing 73. This construction provides a shoulder 111 whose rearward surface 113 serves as a bearing surface for the biasing spring 103. When the sleeve 101 is placed over the enlarged forward end of the housing 73, an annular space 112 is provided which is adapted to contain the biasing spring 103. The shoulder 111 on the inner surface of the sleeve 101 provides a cam surface which is adapted to bear against the locking balls 89 and the resilient sleeve retaining ring 109. The sleeve 101 extends forwardly of the ring 109 and is undercut to provide an overhanging rim 115 which permits outward radial movement of the balls 89 when the connecting members are being moved into and out of engagement with each other. The relative dimensions of the parts are such that the balls 89 are prevented from dropping out of the apertures during the coupling and uncoupling operations.

The cross-sectional diameter of the resilient sleeve retaining ring 109 is such that the center of the ring 109 lies below the surface of housing 73. Thus, it is apparent that the cross-sectional diameter of the ring 109 is greater than but less than twice the depth of the groove 108. The forward surface of the sleeve 101 is machined in such a manner that shearing forces on the retaining ring 109 are minimized. A particularly satisfactory cam surface is provided when the forward portion of the shoulder 111 is machined at an angle of about 45° to form an angularly disposed surface 117. The angular surface of the shoulder 111 causes substantially all of the forces exerted by the biasing spring 103 upon the resilient retaining ring 109 to be absorbed by the ring in compression rather than in shear.

The sliding sleeve 101 and shoulder 111 are proportioned so that the rearward end of the sleeve 101 completely covers the rib 105 when the angular forward surface 117 bears against the resilient retaining ring 109, and at this point, the inner surface shoulder 111 holds the locking balls 89 in their innermost position. As the sleeve 101 is moving rearwardly along the housing 73 compressing the spring 103, the ball-engaging surface of the shoulder 111 uncovers the balls 89 and permits them to move radially outwardly into the space provided by the overhanging rim 115. When the sleeve is released, it moves forwardly due to the biasing action of the spring 103, and the angularly disposed surface 117 acts upon the balls 89 and forces them into the holes 97 provided in the housing 73.

The angularly disposed cam surface 117 controls the position of the locking balls 89, provides a dust-tight seal for the ball locking mechanism when the sliding sleeve 101 is in a forward position against the resilient retaining ring 109, and applies the reaction forces exerted by the biasing spring 103 to the resilient retaining ring 109 as compressive forces rather than as shearing forces. As has been pointed out above, the rearward end of the sleeve 101 covers the rib 105 at all times, thus preventing dust and other foreign materials from working into the annular spring-containing space. The combination of the sleeve and rib construction and the angled cam and the resilient retainer ring assures positive dust-free operation of the interlocking means even under adverse conditions.

The above-described valved coupling is especially adapted for use in apparatus such as farm machinery in which a hydraulically-actuated device on one vehicle is operated from a separate detachable hydraulic pressure unit on another vehicle such as a tractor, and particularly where the pressure within the hydraulically-actuated device may not drop when it is disconnected from the hydraulic pressure unit as when a hydraulic unit on the actuated device is holding a member in a raised position so that a substantial pressure is created in the hydraulic system. In the illustrated embodiment of the invention, the male connecting member is designed to be connected to the hydraulically-actuated device, and its valve member therefor includes the weaker spring 47.

In order to inter-engage the male connecting member 11 which is connected to a conduit which may be at high pressure leading to the hydraulically-actuated device and the female connecting member 71 which is connected to a conduit leading to the hydraulic pressure unit which is temporarily at a lower pressure, the sliding sleeve 71 and the male coupling member 11 is inserted in the socket 77 provided in the housing 73 to a point where the locking balls 89 will engage the groove 35 formed in the male connecting member 11. The sleeve 101 is then released and the action of the biasing spring 103 pressing against the shoulder 111 automatically returns the sleeve 101 to its normal position, causing the lower or camming surface of the shoulder 111 to hold the locking balls in the groove 35 in the male connecting member 11. Figs. 2, 3, and 4 show the valves within the connecting members in a progressive series of positions during the engagement of the connecting members. As the male and female connecting members 11 and 71 are inter-engaged, the forward valve piston portions 67 and 68 of the valve mechanism engage one another as shown in Fig. 2. As the interengagement of the connecting members proceeds, the combined force of the spring 47 and the fluid pressure within the male connecting member 11 forces the engaging stub 68 and the valve piston 44 rearward within the housing 73 to the position shown in Fig. 3, at which position the locking balls 89 engage the groove 35 formed in the male connecting member 11. Then the hydraulic pump, which is located in the fluid system connected to the conduit 18, is actuated, causing the pressure in the conduit 18 and within the female connecting member to rise until it approaches the pressure within the male connecting member. The piston 44 actuated by the stronger spring 48 then forces the piston 43 rearward as shown in Fig. 4 until the circumferential ridge 61 abuts the forward face of the guide member 41. At this point, the valve mechanisms associated with each of the connecting members are in their open position, and hydraulic fluid can flow freely between the conduits 17 and 18. In this connection, it should be noted that the O-ring seal 87, provided around the internal portion of the socket 77, is located in a position such that the O-ring engages the housing 19 of the male connecting member 11 to provide a fluid-tight seal before the engaging stubs 67 and 68 move either of the valves into their open position.

When the connecting members 11 and 71 are inter-engaged and the pressure drops on the side of the hydraulic pressure unit, i. e. on the side of the female connecting member in the illustrated embodiment, the differential force exerted by the springs 47 and 48 is desirably such as to maintain the valve in the male connecting member 11 in open position. This action of the valve insures a flow of pressure fluid through the coupling during fluctuation of the pressure in the system within predetermined limits. In order to accomplish this result, the force exerted by the spring 48 in the female connecting member 71 should be sufficiently greater than the force exerted by the spring 47 in the male connecting member 11 so as to overcome the difference between the force exerted by the hydraulic fluid in the line 17 against the inner end of the bearing ridge 61 and the force exerted by the hydraulic fluid against the inner end of the valve piston 44. This would permit the hydraulically-actuated unit to operate even though the pressure in the hydraulic pressure unit were dropped suddenly during the operation of the system. However, should the pressure in line 18 drop below a predetermined amount, through a failure of the pump or the like, the pressure in the line 17 and the action of the spring 47 will move the valve piston 43 in the male connecting member 11, against the force of the spring 48, to a closing position to trap the fluid in the line 17.

To disconnect the two connecting members, the sliding sleeve 101 is moved rearwardly on the female coupling 71 and the locking balls are permitted to move outwardly from the innermost or locking position, whereupon the springs 47 and 48 within the valve housings and the pressure within the hydraulic system act to force the coupling members apart. As the connecting members move apart, the rings of packing material 45 and 46 carried by the valve pistons move against their respective valve seats to effectively seal the associated conduits 17 and 18.

In order to facilitate the back and forth movement of the sleeve 101 by the operator when the members 11 and 71 are engaged and disengaged, the outer surface of the sleeve 101 includes a depressed section 119 which is knurled to provide a surface which may be easily gripped by the operator. The depressed section 119 also provides an area which may be clamped in a mounting bracket, or the like. A safety-mounting bracket for use with valve couplings having such a sliding sleeve is disclosed and claimed in our copending application, Serial No. 62,202, which was filed on November 26, 1948, and which is now Patent No. 2,699,961, assigned to the assignee of the present invention.

In the foregoing, there has been described a quickly disengageable, two-member, valved coupling which is adapted to efficiently seal the ends of the fluid conduits associated with the coupling. The coupling embodies various novel constructional features which cooperate to provide a device of the class described which may be inter-engaged by exertion of a relatively small force regardless of the hydraulic pressure maintained within the hydraulically-actuated device. This desirable operational characteristic results from the use of biasing means of different relative strengths within the connecting members and a stop within the connecting member on the side of the hydraulically-actuated device which prevents the valve on that side from opening beyond a predetermined point. These features permit the connecting members to be initially inter-engaged while the valve on the side of the hydraulically-actuated device remains closed and automatically opens that valve when pressure is applied by the hydraulic pressure unit.

The described structure may be varied considerably with respect to its structural details. The valve mechanisms within the coupling can also be interchanged as desired so as to be able to connect the female connecting member to the hydraulically-actuated device and the male connecting member to the hydraulic pressure unit. Hence, the scope of the invention, as defined by the claims, should not be limited to the specific details and arrangements herein disclosed but should be interpreted as broadly as is consistent with the state of the prior art.

This application is a continuation-in-part of our copending application, Serial No. 56,824, filed October 27, 1948, now Patent No. 2,665,928.

Various of the features of the invention which are believed to be new are set forth in the appending claim.

We claim:

A valved coupling comprising, a pair of valve housings, inwardly facing valve seats in each of said housings, means releasably coupling said valve housings together, one of said valves including an element movable relative to the associated valve seat, said element having a relatively large pressure bearing surface facing inwardly of the housing, a strong spring disposed within the associated housing in engagement with said one valve for biasing said one valve toward its seat, the other of said valves including a tubular valve guide fixedly positioned within said housing and having its inwardly facing end closed, a valve piston slidably supported in said guide element for movement relative to the associated valve seat, means defining a bleed port leading from a point within said tubular valve guide to a point beyond the last mentioned valve seat, as related to said valve guide when said valve is on said seat, said element and said valve piston, respectively, having outwardly projecting axial portions disposed for engagement with each other when said valve housings are coupled together, a circumferentially projecting portion on said valve piston having an outside diameter greater than the outside diameter of said valve guide, said circumferentially projecting portion having a relatively small fluid pressure bearing surface, as compared with said element, facing inwardly of the housing, and a spring, relatively weak, as compared with the first mentioned spring, disposed between said valve piston and the end portion of said guide element, said circumferentially projecting portion coacting with the outer edge portion of said guide to limit the inward travel of said valve piston, and means for guiding the movement of said element in its associated housing axially of said valve piston portion of the other valve, said means affording engagement of said element with the associated valve seat when said housings are uncoupled from each other.

References Cited in the file of this patent

UNITED STATES PATENTS

| | | |
|---|---|---|
| 950,263 | Harpster | Feb. 22, 1910 |
| 1,973,610 | Connors | Sept. 11, 1934 |
| 2,307,427 | Smith et al. | Jan. 5, 1943 |
| 2,401,674 | Vizay | June 4, 1946 |
| 2,461,818 | Hague | Feb. 15, 1949 |
| 2,509,444 | Mitchell | May 30, 1950 |
| 2,548,368 | Hartley et al. | Apr. 10, 1951 |
| 2,548,528 | Hansen | Apr. 10, 1951 |

FOREIGN PATENTS

| | | |
|---|---|---|
| 632,025 | Great Britain | Nov. 15, 1949 |